(12) United States Patent
Matsuoka (10) Patent No.: US 12,479,137 B2
(45) Date of Patent: Nov. 25, 2025

(54) METHOD FOR MANUFACTURING INJECTION-MOLDED PRODUCT

(71) Applicant: KANEKA CORPORATION, Osaka (JP)

(72) Inventor: Yoshiaki Matsuoka, Settsu (JP)

(73) Assignee: KANEKA CORPORATION, Osaka (JP)

( * ) Notice: Subject to any disclaimer, the term of this patent is extended or adjusted under 35 U.S.C. 154(b) by 268 days.

(21) Appl. No.: 18/552,388

(22) PCT Filed: Mar. 7, 2022

(86) PCT No.: PCT/JP2022/009666
§ 371 (c)(1),
(2) Date: Sep. 25, 2023

(87) PCT Pub. No.: WO2022/209602
PCT Pub. Date: Oct. 6, 2022

(65) Prior Publication Data
US 2024/0173902 A1     May 30, 2024

(30) Foreign Application Priority Data

Mar. 30, 2021    (JP) ................................ 2021-058567

(51) Int. Cl.
| B29C 45/34 | (2006.01) |
| B29C 45/00 | (2006.01) |
| B29K 67/00 | (2006.01) |

(52) U.S. Cl.
CPC .......... B29C 45/0001 (2013.01); B29C 45/34 (2013.01); *B29K 2067/04* (2013.01)

(58) Field of Classification Search
CPC .. B29C 45/0001; B29C 45/0025; B29C 45/34
See application file for complete search history.

(56) References Cited

U.S. PATENT DOCUMENTS

| 2019/0359818 A1 | 11/2019 | Minami |
| 2022/0258387 A1 | 8/2022 | Katsuta et al. |

FOREIGN PATENT DOCUMENTS

| JP | 2020-66224 A | 4/2020 |
| JP | 2021-20431 A | 2/2021 |

(Continued)

OTHER PUBLICATIONS

Lau, "Venting system or air vents in plastic injection mold", Sositarmould, Retrieved from the Internet [URL: https://web.archive.org/web/20210303053714/https://sositarmould.com/venting-system/], Mar. 3, 2021, 9 pages, XP093257012.

(Continued)

*Primary Examiner* — James Sanders
(74) *Attorney, Agent, or Firm* — Oblon, McClelland, Maier & Neustadt, L.L.P.

(57) ABSTRACT

An object of the present invention is to provide a method for manufacturing an injection-molded product of a resin composition containing a P3HA-based resin, capable of performing stable continuous production without generating flash. To achieve the object, provided is a method for manufacturing an injection-molded product by using a mold apparatus for a resin composition containing a P3HA-based resin, the P3HA-based resin being a copolymer containing at least one kind of copolymer of a 3HB unit and another hydroxyalkanoate unit, a parting line that is in contact with a cavity inside a mold included in the mold apparatus having a maximum width of not more than 30 μm, a vent portion being provided at a specific position inside the mold, the vent portion having an opening portion with a maximum width of 1 μm to 50 μm.

20 Claims, 5 Drawing Sheets

(56) References Cited

FOREIGN PATENT DOCUMENTS

WO  WO 2017/138392 A1   8/2017
WO  WO 2021/010054 A1   1/2021

OTHER PUBLICATIONS

Ivory, "Why You Must Optimize Cooling and Venting in Plastic Injection Molds", Crescent Industries, Retrieved from the Internet [URL: https://www.crescentind.com/blog/why-you-must-optimize-cooling-and-venting-in-plastic-injection-molds], Posted May 6, 2015, Updated May 2019, 8 pages. XP093255730.
Kerkstra, "TOOLING: Flash-Free Molding: Part 1", Plastics Technology, Retrieved from the Internet [URL: https://web.archive.org/web/20200727003358/https://www.ptonline.com/articles/tooling-flash-free-molding-part-1], Sep. 22, 2014, 6 pages, XP093257347.
Extended European Search issued Mar. 25, 2025 in European Patent Application No. 22779826.1, 15 pages.
International Search Report issued on Apr. 5, 2022 in PCT/JP2022/009666 (with English translation), 4 pages.
International Preliminary Report on Patentability and Written Opinion issued on Oct. 3, 2023 in PCT/JP2022/009666 (with English translation), 7 pages.

METHOD FOR MANUFACTURING INJECTION-MOLDED PRODUCT

CROSS-REFERENCE TO RELATED APPLICATIONS

The present application is a 35 U.S.C. § 371 national stage patent application of International patent application PCT/JP2022/009666, filed on Mar. 7, 2022, which is based on and claims the benefits of priority to Japanese Application No. 2021-058567, filed on Mar. 30, 2021. The entire contents of these applications are incorporated herein by reference.

TECHNICAL FIELD

The present invention relates to a method for manufacturing an injection-molded product by using a mold apparatus for a resin composition containing a poly(3-hydroxyalkanoate)-based resin (hereinafter, may be referred to as "P3HA-based resin").

BACKGROUND ART

Recently, environmental problems caused by waste plastics have attracted attention. In particular, it has been understood that large amounts of plastics flowing into oceans, by ocean dumping or via rivers, have drifted through the oceans on a global scale. Such plastics remain in shape for a long period of time. Therefore, it has been pointed out that such plastics can affect ecosystems by, for example, causing so-called ghost fishing, which refers to the restraint or capture of marine organisms with drifting plastics, and eating disorders caused by plastics that have been ingested by marine organisms and have remained in those digestive systems.

In addition, the following problems have also been pointed out. That is, ultraviolet light etc. causes the plastics to be disintegrated and to be micronized into microplastics that adsorb hazardous compounds present in the oceans. Then, marine organisms ingest these microplastics, resulting in incorporation of hazardous substances into the food chain.

To cope with marine pollution caused by such plastics, use of biodegradable plastics is expected. However, a report compiled by the United Nations Environment Program in 2015 pointed out that compost-biodegradable plastics such as polylactic acid cannot be a measure against marine pollution because they cannot be expected to be decomposed within short periods of time in a low-temperature real ocean.

Under these circumstances, P3HA-based resins are attracting attention as a material capable of solving these problems because the P3HA-based resins are a material that can be biodegraded even in seawater.

For example, Patent Literature 1 discloses a method for manufacturing an injection-molded product from a molding material containing a poly(3-hydroxybutyrate)-based resin. This method includes the steps of: heating the molding material to a temperature that is between a melting point peak and an end temperature of the melting point peak, to melt the molding material, the difference between the melting point peak temperature and the melting point peak end temperature in differential scanning calorimetry being not less than 10° C. and not more than 70° C., and injecting the molten molding material into a mold having a temperature ranging from 30° C. to 80° C.; and cooling the molding material inside the mold to crystallize and solidify the molding material.

Also, Patent Literature 2 discloses a mold apparatus for use in injection molding of a biodegradable resin containing poly(3-hydroxyalkanoate). The mold apparatus includes: a hot runner that melts the biodegradable resin by heating; a plurality of cavities filled with the molten resin heated and melted by the hot runner by injection; and a plurality of gates that provide communication between the hot runner and the cavities. The plurality of cavities are identical in flow length of the biodegradable resin from a position of each gate, serving as a reference point, to a filling end position in a corresponding cavity.

CITATION LIST

Patent Literature

Patent Literature 1

International Publication No. WO 2021/010054

Patent Literature 2

Japanese Patent Application Publication Tokukai No. 2021-020431

SUMMARY OF INVENTION

Technical Problem

Although the foregoing techniques are superior, even if these techniques were combined, it would be difficult to completely satisfy a flash reduction requirement; this would be insufficient for stable production.

Therefore, an object of the present invention is to provide a method for manufacturing an injection-molded product of a resin composition containing a P3HA-based resin, capable of performing stable continuous production without generating flash.

Solution to Problem

As a result of conducting diligent studies in order to attain the above object, the inventors of the present invention completed the present invention after newly finding that, in manufacturing an injection-molded product of a P3HA-based resin containing at least one kind of copolymer of a 3-hydroxybutyrate (hereinafter, also simply referred to as "3HB") unit and another hydroxyalkanoate unit, especially, a P3HA-based resin with a low ratio of a 3-hydroxyhexanoate (hereinafter, also simply referred to as "3HH") unit, which is the another hydroxyalkanoate unit (i.e., a P3HA-based resin with a high ratio of the 3HB unit), use of a specific mold achieves stable continuous production without generating flash.

Thus, an aspect of the present invention is a method for manufacturing an injection-molded product by using a mold apparatus for a resin composition containing a P3HA-based resin, the P3HA-based resin being a copolymer containing at least one kind of copolymer of a 3HB unit and another hydroxyalkanoate unit, a mold included in the mold apparatus being configured so that: a parting line that is in contact with a cavity inside the mold when the mold is closed has a maximum width of not more than 30 μm; and a vent portion is provided at a position different from a position of the parting line that is in contact with the cavity inside the mold, the vent portion having an opening portion with a maximum width of 1 μm to 50 μm.

Advantageous Effects of Invention

According to an aspect of the present invention, in manufacturing an injection-molded product of a resin composition containing a P3HA-based resin, it is possible to achieve stable continuous production without generating flash.

DESCRIPTION OF EMBODIMENTS

An embodiment of the present invention will be described in detail. Note that any numerical range expressed as "A to B" in the present specification means "not less than A and not more than B" unless otherwise stated. All literatures listed in the present specification are incorporated herein by reference.

[1. Overview of the Present Invention]

A method for manufacturing an injection-molded product by using a mold apparatus for a resin composition containing a P3HA-based resin, in accordance with an embodiment of the present invention (hereinafter, referred to as "present manufacturing method"), the P3HA-based resin being a copolymer containing at least one kind of copolymer of a 3HB unit and another hydroxyalkanoate unit, a mold included in the mold apparatus being configured so that: a parting line that is in contact with a cavity inside the mold when the mold is closed has a maximum width of not more than 30 μm; and a vent portion is provided at a position different from a position of the parting line that is in contact with the cavity inside the mold, the vent portion having an opening portion with a maximum width of 1 μm to 50 μm.

As mentioned above, P3HA-based resins are a material that can be biodegraded even in seawater, and thus, the P3HA-based resins are attracting attention as a material capable of solving the problems of marine pollution that has been caused by the abovementioned plastics. However, it has been known that it is difficult to process the P3HA-based resins by molding because of its slow solidification rate, and it is difficult to balance flash and sink, especially in injection molding.

While advancing the study of manufacturing of an injection-molded product by using the P3HA-based resins, the inventors of the present invention have found the following problem: a P3HA-based resin containing at least one kind of copolymer of a 3HB unit and another hydroxyalkanoate unit, especially, a P3HA-based resin with a low ratio of a 3HH unit, which is the another hydroxyalkanoate unit (a P3HA-based resin with a high ratio of the 3HB unit), is more prone to generate flash than other resins.

Therefore, as a result of conducting diligent studies to attain the abovementioned object, the inventors of the present invention have found that setting the maximum width (maximum gap) of a parting line of a mold to be less than or equal to a predetermined value can reduce flash generated. However, setting the maximum width of the parting line to be less than or equal to the predetermined value causes a new problem, that is, difficulty in discharging gas. Therefore, the inventors of the present invention have further provided a vent portion at a position different from that of the parting line of the mold, to allow stable continuous production without generating flash.

Conventional techniques have investigated conditions for manufacturing an injection-molded product of a P3HA-based resin, such as a melting point peak temperature of the resin, which is a raw material, and a flow length of the resin. In contrast, the inventors of the present invention have found the abovementioned new problem in the process of manufacturing an injection-molded product of a P3HA-based resin. Then, by focusing on, especially, the structure of the mold, the inventors of the present invention have succeeded in manufacturing an injection-molded product with less flash.

According to the present invention, it is possible to stably perform continuous production without generating flash, so that the present invention is extremely useful in manufacturing an injection-molded product by using a P3HA-based resin (especially, a P3HA-based resin with a high ratio of 3HB). The following description will discuss in detail the present manufacturing method.

[2. Method for Manufacturing Injection-Molded Product]

The present manufacturing method is a method for manufacturing an injection-molded product by using a mold apparatus for a resin composition containing a P3HA-based resin, which is a copolymer containing at least one kind of copolymer of a 3HB unit and another hydroxyalkanoate unit. Further, in the present manufacturing method, a mold included in the mold apparatus is configured so that: a parting line that is in contact with a cavity inside the mold when the mold is closed has a maximum width of not more than 30 μm; and a vent portion is provided at a position different from a position of the parting line that is in contact with the cavity inside the mold, the vent portion having an opening portion with a maximum width of 1 μm to 50 μm.

As used herein, the "parting line that is in contact with the cavity inside the mold" means a gap formed in the interface between the mold parts constituting the mold when the mold is closed. That is, the "parting line that is in contact with the cavity inside the mold" is not present in a state in which the mold is open, and is a gap that is present only when the mold is closed. As used herein, the "parting line that is in contact with the cavity inside the mold" is also simply referred to as the "parting line".

(Mold Apparatus)

The following description will discuss in detail an embodiment of a mold apparatus for use in the present manufacturing method (hereinafter, also referred to as "present mold apparatus") with reference to FIG. 1. It should be noted that the mold apparatus depicted in FIG. 1 is merely an example, and the mold apparatus for use in the present manufacturing method is not limited to that depicted in FIG. 1.

Figure 1:
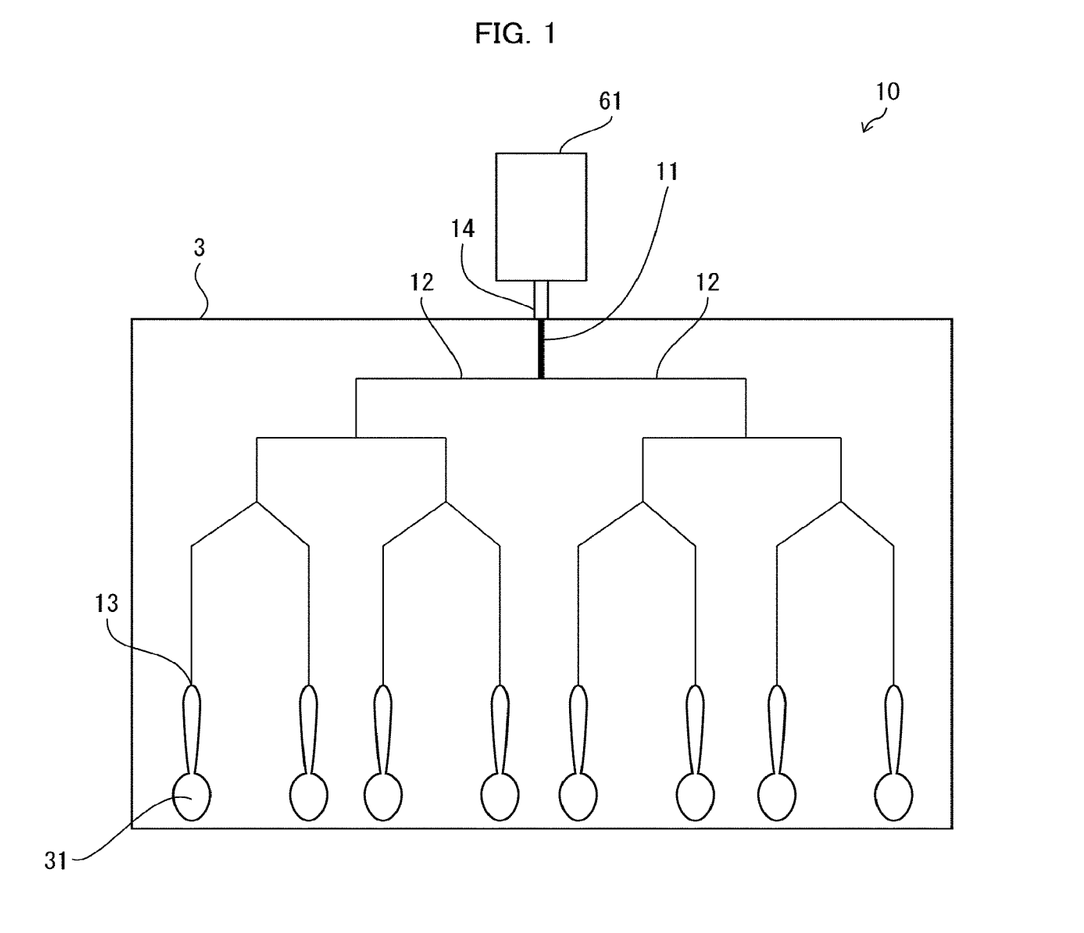
FIG. 1 is a schematic diagram illustrating an overview of a mold apparatus in accordance with an embodiment of the present invention.

FIG. 1 is a schematic plan view of an overview of the present mold apparatus. As illustrated in FIG. 1, a mold apparatus 10 is constituted by an injection molding machine

61 and a mold 3. The mold 3 includes a sprue 11, a runner 12, a gate 13, and at least one cavity 31.

The resin composition, which is a raw material of an injection-molded product, is injected through a nozzle 14 of the injection molding machine 61 in a fluid state (molten state) and is supplied into the sprue 11 inside the mold 3. Subsequently, the fluid-state resin composition from the sprue 11 passes through the runner 12 and is supplied into the cavity 31 via the gate 13. After the resin composition supplied into the cavity 31 hardens, the resin composition is cut at the gate 13, so as to be taken out from the mold 3 as an injection-molded product.

The sprue 11 is a component for delivering the resin composition to the runner 12. The runner 12 is a component that connects between the sprue 11 and the gate 13. The runner 12 may be branched. In this case, the branched runner 12 can connect the sprue 11 to multiple gates 13. The runner 12 may be a hot runner or a cold runner. The gate 13 is an opening that provides communication between the runner 12 and the cavity 31.

Subsequently, the mold 3 of the present mold apparatus 10 will be described in detail with reference to FIGS. 2 and 3. It should be noted that the mold depicted in FIGS. 2 and 3 is merely an example, and the mold for use in the present manufacturing method is not limited to that depicted in FIGS. 2 and 3.

Figure 2:
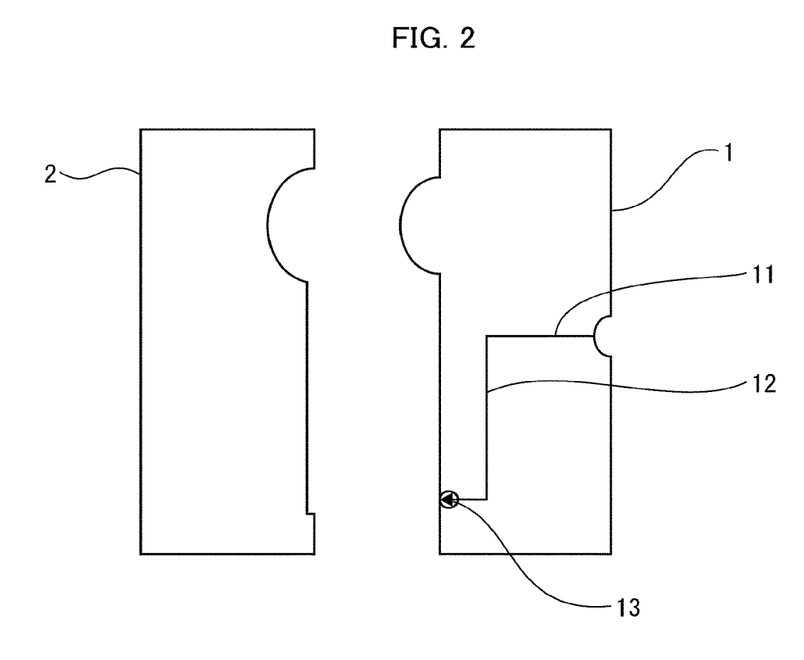
FIG. 2 is a schematic diagram illustrating an open state of a mold in accordance with an embodiment of the present invention.
Figure 3:
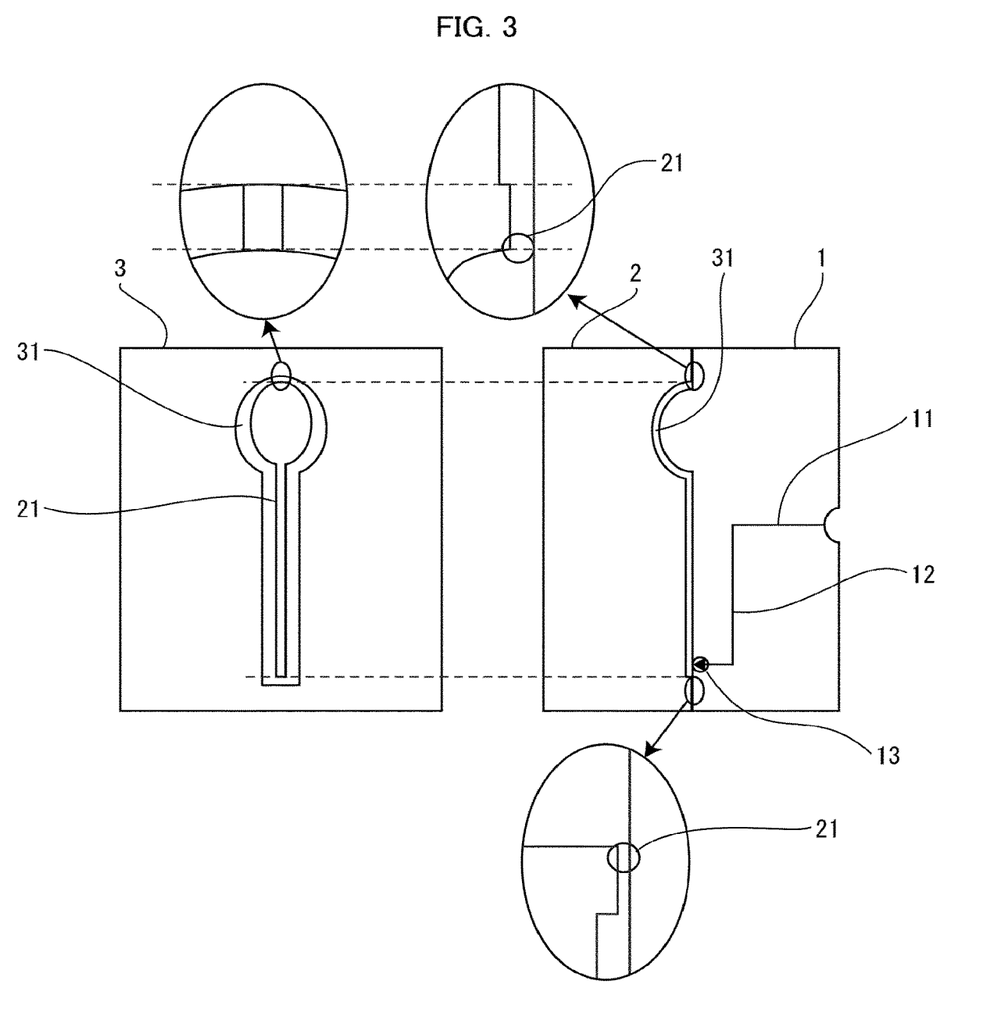
FIG. 3 is a schematic diagram illustrating a closed state of the mold in accordance with an embodiment of the present invention.

FIG. 2 is a schematic cross-sectional view of the mold 3 in an open state. FIG. 3 is a schematic plan view and a cross-sectional view of the mold 3 in a closed state. A mold portion of the mold 3 is constituted by a mold (protruding part) 1 and a mold (concave part) 2. The mold (protruding part) 1 includes a sprue 11, a runner 12, and a gate 13. The mold (concave part) 2 includes a cavity 31 into which the resin composition flows. Combining (i.e., closing) the mold (protruding part) 1 and the mold (concave part) 2 forms a parting line 21 at the interface between these mold parts.

The parting line 21 of the mold 3 constituting the present mold apparatus 10 (hereinafter, also referred to as "present mold") has a maximum width (maximum gap) of not more than 30 μm, preferably not more than 20 μm, and more preferably not more than 10 μm, and further preferably, there is substantially no gap (i.e., 0 μm). When the maximum width of the parting line 21 is greater than 30 μm as commonly used in conventional techniques, use of a P3HA-based resin with a high ratio of the 3HB unit in the present manufacturing method may cause the molten resin composition to be likely to leak out of the cavity 31. Thus, setting the maximum width of the parting line 21 to not more than 30 μm reduces leakage of the resin composition to the outside of the cavity 31, and reduces flash of the resulting molded body.

The shape of the cavity 31 is not particularly limited, but may be preferably a shape suitable for molding multiple products. An injection-molded product adapted to be molded by the cavity 31 is an injection-molded product to be discarded after use. Examples of such an injection-molded product may include a spoon, a fork, a knife, a muddler, a coffee capsule, a tray, a cup, a jar, a cable tie, a cap for a bottle, a cap for a pen, a pen, a clip for agricultural use, and a frame part of a fan. Among these, the injection-molded product is preferably a disposable molded product for food use. Examples of such a molded product may include a spoon, a fork, a knife, a muddler, a coffee capsule, a tray, and a cup. In addition, the injection-molded article is more preferably cutlery. Examples of the cutlery may include a spoon (e.g., a spoon molded by the cavity 31 illustrated in FIGS. 1 to 4), a fork, a knife, and a muddler. The injection-molded product can be preferably used in agriculture, fisheries, forestry, horticulture, medicine, hygiene products, clothing, non-clothing, packaging, and other fields.

As illustrated in FIG. 1, the present mold 3 preferably includes two or more cavities 31 that are identical in shape. The number of the cavities 31 is more preferably not less than four, further preferably not less than eight, and particularly preferably not less than 16.

Since the present mold apparatus 10 has multiple cavities 31 that are identical in shape, it is possible to manufacture the large number of injection-molded products having the same quality at once. Therefore, it is possible to more efficiently perform stable continuous production of the injection-molded product.

The present mold apparatus 10 is preferably configured so that the distances from the tip of the nozzle 14 of the injection molding machine 61 to each cavity 31 are even. Specifically, the mold apparatus 10 preferably has the shape as illustrated in FIG. 1, for example. It can be said that when the mold apparatus 1 has the shape as illustrated in FIG. 1, the distances from the tip of the nozzle 14 of the injection molding machine 61 to each cavity 31 are even. It should be noted that the injection molding apparatus depicted in FIG. 1 is merely an example, and the shape of the injection molding apparatus for use in the present manufacturing method is not limited to that depicted in FIG. 1. For example, the shape of the runner 12 of the present mold 3 may be a shape that has a depth (three-dimensional besides the shape illustrated in FIG. 1. When the runner 12 has such a shape that has a depth, it is preferable that the shape of the runner 12 be in a linear symmetrical shape (i.e., having multiple identical shapes), centered on the injection molding machine 61, in terms of equalizing the abovementioned distances.

When the present mold apparatus 10 has the foregoing configuration, the distances from the nozzle 14 to each cavity 31 are equal, so that it becomes possible to fill each cavity 31 with the resin at almost identical timing, resulting in improved productivity.

In the present mold 3, the resin composition inside the sprue 11 and the runner 12 is preferably in a molten state (fluid state). Thus, the sprue 11 and the runner 12 are preferably heated to or above the melting point of the resin composition by a heater, infrared rays, or the like. In other words, the resin composition is preferably supplied from the runner 12 into the cavity 31 in a molten state. Therefore, the runner 12 in the present manufacturing method is preferably a hot runner.

When the resin composition inside the sprue 11 and the runner 12 is in a molten state, it will be possible to equally supply the resin in all the cavities 31, so that flash of injection-molded products are less likely to be generated. In addition, wastes of the resin composition, which is a raw material, is hardly produced.

The gate 13 of the present mold 3 is preferably openable and closable. The mechanism for opening and closing the gate 13 is not particularly limited, but the gate 13 may be opened and closed by, for example, a valve pin (not illustrated) provided inside the runner 12. When the runner 12 is provided with a valve pin, the valve pin may be disposed in the flow passage of the resin composition in the runner 12. Further, the outer diameter of the mold-side tip portion of the valve pin is preferably formed almost identical to, or slightly smaller than the inner diameter of the gate 13.

Closing the gate 4 with the tip portion of the valve pin prevents the resin composition from being discharged from gate 13. In addition, the injection molding apparatus is preferably provided with a mechanism for reciprocating the valve pin. In this case, the valve pin is configured so as to move in reciprocating motion vertically in the flow passage of the resin composition in the runner 12, so that the vertical reciprocating motion of the valve pin opens and closes the gate 13.

Thus, since use of the opening and closing mechanism such as a valve pin enables the gate 13 to be opened and closed, it is possible to instantly cut off the resin composition supplied through the gate 13 when the discharge of the resin composition from the gate 13 is stopped. Thus, it is possible to precisely control the discharge amount of the resin composition from the runner 12.

In the present mold 3, a value obtained by dividing the total volume of the sprue 11, the runner 12, and the gate or gates 13 by the total volume of the cavity or cavities 31 is preferably 0.5 to 5.0, more preferably 0.8 to 4.0, further preferably 1.0 to 3.0, and particularly preferably 1.0 to 2.0.

With the foregoing configuration, it is possible to shorten the residence time of the resin composition within the sprue 11 and the runner 12. When the residence time of the resin composition is short, the temperature is easy to become uniform, so that the resin composition is less prone to being subjected to pyrolysis, and thus, it is possible to obtain a less flash injection-molded product. It should be noted that the "total volume of the cavity or cavities" can also be expressed as the "total volume of a product or products".

Figure 4:
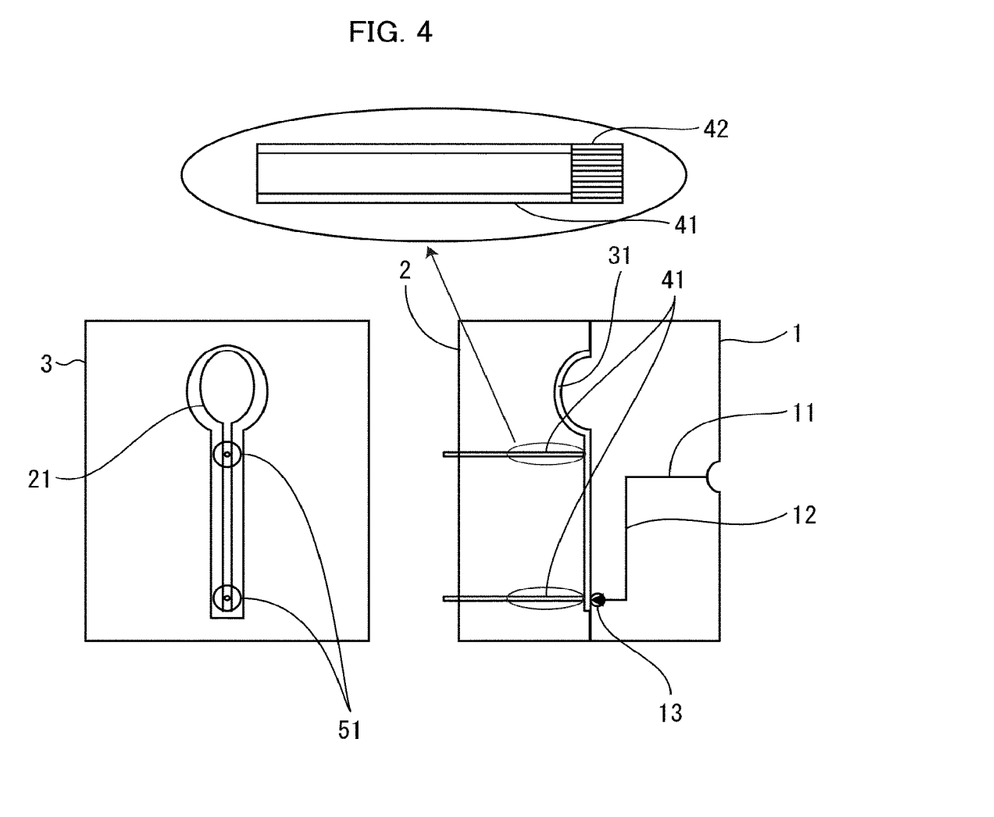
FIG. 4 is a schematic diagram illustrating a closed state of a mold that is provided with a vent portion with an opening portion having a slit-type structure, in accordance with an embodiment of the present invention.

The present mold 3 includes a vent portion 41 at a position different from that of the parting line 21. The vent portion 41 will be described in detail with reference to FIG. 4. FIG. 4 is a plan view and a cross-sectional view of the mold schematically illustrating a closed state of the vent portion 41 included in the mold. The position of the vent portion 41 is not limited to that illustrated in FIG. 4, and may be positioned at any position, provided that the position is different from that of the parting line 21. The number of the vent portion 41 is not limited thereto, and may be one, two, three, four, and five or more.

When the resin composition is loaded into a cavity 31, a trace amount of gas that has existed in the cavity and that is generated from the molten resin is compressed to a high pressure state. This makes it difficult to fill the cavity 31 with the resin composition. Therefore, it is necessary to discharge the gas. According to the conventional art, such gas is discharged from the parting line 21 or the like. However, as mentioned above, the maximum width of the parting line 21 of the present mold is very narrow, so that the gas cannot be sufficiently discharged. Therefore, providing the vent portion 41 at a portion different from that of the parting line 21 enables the present mold to discharge gas in the cavity 31 to the outside.

The present mold 3 preferably has a mechanism for drawing out gas through the vent portion 41. Examples of the mechanism for drawing out gas may include, but are not limited to, a water-sealed vacuum pump and a dry roots-type vacuum pump. Among these, it is preferable to be a vacuum pump in view of its superior ability to vacuum.

Since the vent portion 41 is provided with the mechanism for drawing out gas, gas within the cavity 31 can be discharged more efficiently, resulting in improved productivity of an injection-molded product.

The maximum width of the opening portion of the vent portion 41 is 1 µm to 50 µm, preferably 2 µm to 40 µm, more preferably 3 µm to 30 µm, and even more preferably 3 µm to 15 µm. When the maximum width of the opening portion of the vent portion 41 is not more than 50 µm, it is possible to sufficiently discharge gas and to reduce flash. Further, when the width of the vent portion is not less than 1 µm, gas within the cavity 31 can be sufficiently discharged.

The structure of the opening portion of the vent portion 41 is preferably at least one type selected from the group consisting of a slit type, a porous type, a nested type, and an opening-and-closing type. If the opening portion of the vent portion 41 has the structure of any of these types, gas within the cavity 31 can be easily discharged.

Figure 5:
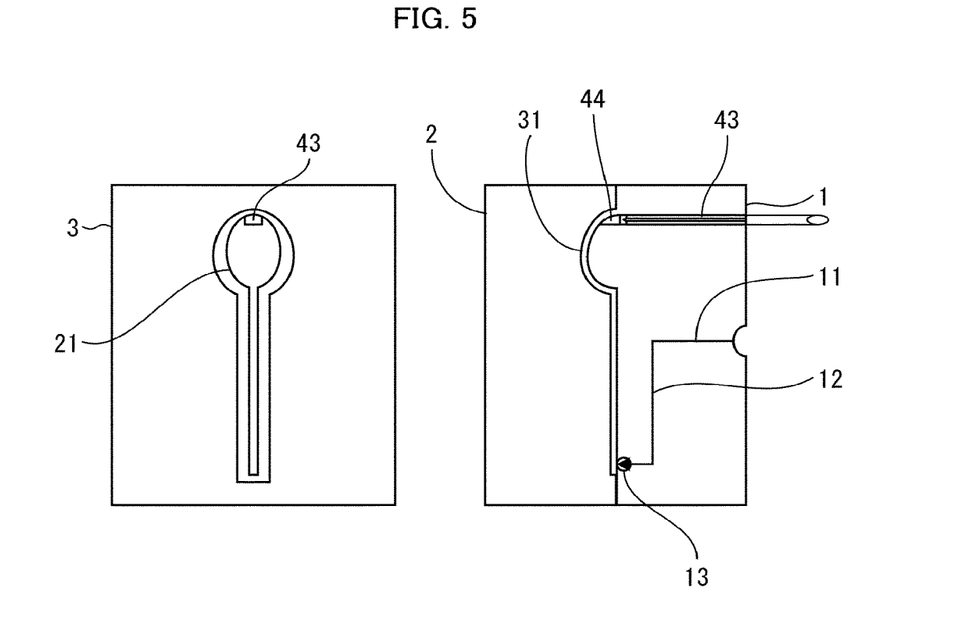
FIG. 5 is a schematic diagram illustrating a closed state of a mold that is provided with a vent portion with an opening portion having a nested-type structure, in accordance with an embodiment of the present invention.

The slit type is a type in which a slit 42 having a length of 1 µm to 50 µm is formed on the surface of the cavity 31, to thereby allow gas to be discharged from the slit 42 to the outside of the cavity 31. An example of a slit-type structure is illustrated in FIG. 4. In a case where the vent portion 41 has the opening portion of the slit type, the vent portion 41 includes, for example, a slit 42, as illustrated in FIG. 4. Among the structures of the opening portion of vent portion 41, the porous type utilizes a porous substance in which its pores are connected to each other, to allow gas to be ultimately discharged from the cavity 31. The nested type is a type in which a part of the cavity 31 is nested so as to allow gas to be discharged from the cavity through a gap formed thereby. An example of the nested-type structure is illustrated in FIG. 5. In a case where the vent portion 41 has the opening portion of the nested type, the vent portion 41 includes, for example, a nested portion 43, as illustrated in FIG. 5. The gas within the cavity 31 is discharged through the opening portion (nested type) 44 of the vent portion at which the nested portion 43 and the cavity 31 is in contact with each other. The opening and closing type is a type configured so that an opening and closing portion is open at a filling stage of the cavity 31 with the molten resin until when the molten resin is about to reach the opening and closing portion, to allow gas to be discharged from the cavity 31, and the opening and closing portion is then closed immediately before the melting resin reaches the opening and closing portion. In any of the types of the vent portion 41, it is preferable that the maximum width of the opening portion be 1 µm to 50 µm.

In a case where multiple vent portions 41 are provided, the opening portions of the respective vent portions 41 may be identical in maximum width, or different in maximum width. The structures of the opening portions of the respective vent portions 41 may be obtained by combining two or more types.

The present mold 3 may further include a mechanism for taking out an injection-molded product from the cavity 31. Examples of such a mechanism may include an eject pin 51 illustrated in FIG. 4. In a case where the present mold 3 includes this mechanism, the vent portion 41 may be provided at the same position as that of the eject pin 51.

(P3HA-Based Resin)

The resin composition for use in the present manufacturing method includes a P3HA-based resin. As used herein, the "P3HA-based resin" means biodegradable aliphatic polyester (preferably a polyester with no aromatic ring). The P3HA-based resin is a polyhydroxyalkanoate that contains a 3-hydroxyalkanoate repeating unit as a repeating unit, represented by the general formula of [—CHR—CH$_2$—CO—O—] (in which, R is an alkyl group represented by C$_n$H$_{2n+1}$, and n is an integer from 1 to 15).

Further, the P3HA-based resin is a copolymer containing at least one kind of copolymer of a 3HB unit and another hydroxyalkanoate unit. With respect to the total repeating units (100 mol %), the 3-hydroxybutyrate unit in the poly (3-hydroxyalkanoate)-based resin is preferably 80.0 mol % to 99.5 mol %, more preferably 90.0 mol % to 99.0 mol %, even more preferably 93.0 mol % to 98.7 mol %, and further more preferably 94.0 mol % to 98.5 mol.

When the composition ratio of the 3HB repeating unit is not less than 80.0 mol %, there is a tendency to improve the rigidity of the P3HA-based resin, increase the crystallization speed, decrease flash, and improve the productivity. On the other hand, when the composition ratio of the 3HB repeating unit is not more than 99.5 mol %, the melting point decreases below the thermal decomposition temperature, so that it is possible to stably perform continuous production. It should be noted that the monomer composition ratio of the P3HA-based resin can be determined by gas chromatography etc. (see International Publication No. WO 2014/020838, for example).

More specifically, as the P3HA-based resin, examples of a copolymer of 3HB and another hydroxyalkanoate may include poly(3-hydroxybutyrate) (P3HB), poly(3-hydroxybutyrate-co-3-hydroxyvalerate) (P3HB3HV), poly(3-hydroxybutyrate-co-3-hydroxyhexanoate) (P3HB3HH), poly(3-hydroxybutyrate-co-3-hydroxyvalerate-co-3-hydroxyhexanoate) (P3HB3HV3HH), poly(3-hydroxybutyrate-co-4-hydroxybutyrate) (P3HB4HB), poly(3-hydroxybutyrate-co-3-hydroxyoctanoate), and poly(3-hydroxybutyrate-co-3-hydroxydecanoate).

It should be noted that P3HA-based resins which are produced by microorganisms (microbial P3HA-based resins) are a P3HA-based resin that is normally constituted by only a polyhydroxyalkanoic acid monomer unit of the D-configuration (R-configuration). Among the microbial P3HA-based resins, P3HB, P3HB3HH, P3HB3HV, P3HB3HV3HH, and P3HB4HB are preferable, and P3HB, P3HB3HH, P3HB3HV, P3HB4HB are more preferable, in view of its ease of industrial production.

The microorganisms that produce the microbial P3HB-based resin are not limited to a particular one, provided that the microorganisms are capable of producing the P3HA-based resins. For example, the first P3HB-producing bacteria discovered was *Bacillus megaterium* (discovered in 1925), and other examples of a P3HB-producing bacteria include natural microorganisms such as *Cupriavidus necator* (previously classified as *Alcaligenes eutrophus*), *Ralstonia eutropha*, and *Alcaligenes latus*. These microorganisms are known to accumulate P3HB within bacterial cells of the microorganisms.

Known bacteria that produce a copolymer of hydroxybutyrate and another hydroxyalkanoate include *Aeromonas caviae*, which is a bacterium capable of producing P3HB3HV and P3HB3HH, and *Alcaligenes eutrophus*, which is a bacterium capable of producing P3HB4HB. Particularly with respect to P3HB3HH, *Alcaligenes eutrophus* AC32 (FERM BP-6038) (T. Fukui, Y. Doi, J. Bateriol., 179, pp. 4821-4830 (1997)), into which genes of P3HA-based resin synthetases have been introduced in order to increase P3HB3HH productivity, is more preferable. Bacterial cells of these microorganisms which have been cultured under appropriate conditions to accumulate P3HB3HH in the bacterial cells are used. Apart from the above, depending on the P3HA-based resins to be produced, genetically modified microorganisms into which various genes associated with synthesis of the P3HA-based resins have been introduced can be used, and culture conditions including substrate type can be optimized.

The molecular weight of the P3HA-based resin is not particular one, provided that it exhibits limited to a substantially sufficient physical properties for the intended use. The weight average molecular weight range of the P3HA-based resin is preferably 100,000 to 1,000,000, more preferably 150,000 to 700,000, even more preferably 200,000 to 500,000, and particularly preferably 250,000 to 450,000. A weight average molecular weight of not less than 100,000 provides appropriate mechanical strength. In addition, a molecular weight of not more than 1,000,000 can reduce the increase in melt viscosity, and provide superior moldability.

A determination method of the weight average molecular weight uses the gel permeation chromatography (GPC) ("Shodex GPC-101" manufactured by Showa Denko K.K.) in which a polystyrene gel ("Shodex K-804" manufactured by Showa Denko K.K.) is used in a column and chloroform is used as a mobile phase, determining the weight average molecular weight as a molecular weight in terms of polystyrene. At this time, a calibration curve is made by using polystyrene with a weight average molecular weight of 31,400, 197,000, 668,000, and 1,920,000. As a column for the GPC, any column appropriate for determining the molecular weight may be used.

The resin composition in the present manufacturing method may contain a second P3HA-based resin in addition to the P3HA-based resin. The second P3HA-based resin contains at least one kind of copolymer of a 3HB unit and another hydroxyalkanoate unit. The 3HB unit in the poly(3-hydroxyalkanoate)-based resin is preferably 65.0 mol to 90.0 mol, more preferably 68.0 mol to 88.0 mol, and even more preferably 70.0 mol to 85.0 mol. Since the resin composition further contains a second P3HA-based resin, a molded article has superior toughness.

The second P3HA-based resin only needs to differ from the P3HA-based resin, but this is not limited thereto. Examples of the second P3HA-based resin may include resins mentioned above as the examples of the P3HA-based resin.

The content of the second P3HA-based resin is not particularly limited and may be preferably not more than 50 parts by weight, more preferably not more than 45 parts by weight, and even more preferably not more than 40 parts by weight, with respect to 100 parts by weight of the total P3HA-based resin. The lower limit of the content of the second P3HA-based resin is not particularly limited, and may be 0 parts by weight. It should be noted that the second P3HA-based resin may use the P3HA-based resin described above. As used herein, the "total P3HA-based resin" is intended to refer to all the P3HA-based resins included in the resin composition in the present manufacturing method.

The resin composition may include another resin other than the P3HA-based resins to the extent that the another resin does not impair the advantageous effects of the present invention. Examples of such another resin may include: aliphatic polyester-based resins such as a polybutylene succinate adipate, a polybutylene succinate, a polycaprolactone, and a polylactic acid; and aliphatic aromatic polyester-based resins such as a polybutylene adipate terephthalate, a polybutylene sebacate terephthalate, and a polybutylene azelate terephthalate. This another resin may include only one kind of resin, or may include two or more kinds of resins.

The content of the another resin is not particularly limited, and may be preferably not more than 50 parts by weight and more preferably not more than 40 parts by weight, with respect to 100 parts by weight of the total P3HA-based resin. The content is even more preferably not more than 30 parts by weight. The lower limit of the content of the another resin is not particularly limited, and may be 0 parts by weight.

It is preferable that the resin composition further contain an inorganic bulking agent. Since the resin composition contains the inorganic bulking agent, it is possible to improve the crystallization speed, to reduce flash, to improve the production cycle, and the like.

Examples of the inorganic bulking agent are not particularly limited and may include talc, calcium carbonate, mica, silica, glass fibers, and glass particles.

The content of the inorganic bulking agent is, for example, 0 parts by weight to 60 parts by weight, preferably 5 parts by weight to 50 parts by weight, more preferably 10 parts by weight to 40 parts by weight, and particularly preferably 15 parts by weight to 35 parts by weight, with respect to 100 parts by weight of the total P3HA-based resin. When the content of the inorganic bulking agent is within these ranges, it is possible to achieve both the sufficient crystallization speed and the toughness.

The resin composition may also contain an additive capable of being used together with the P3HA-based resin, provided that the advantageous effects of the present invention are not impaired. Examples of such an additive may include: coloring agents such as pigments and dyes; deodorizing agents such as activated carbon and zeolite; perfumes such as vanillin and dextrin; plasticizers; antioxidants; anti-oxidative agents; weather resistance improving agents; ultraviolet ray absorbing agents; crystal nucleating agents; lubricants; mold releases; water repellent agents; antibacterial agents; and slidability improving agents. As the additive, only one kind of additives may be contained, or two or more kinds of additives may be contained. The content of these additive can be set by a person skilled in the art as appropriate according to the purpose of use.

(Injection Molding)

It is preferable that the injection molding in the present manufacturing method be performed at a resin composition temperature that is not less than an end temperature of a melting point peak determined by differential scanning calorimetry in the resin composition. With this configuration, it is possible to sufficiently melt the resin, resulting in superior appearance. Determination of the end temperature of the melting point peak is carried out by the method described later in Examples.

The present invention is not limited to the embodiments, but can be altered by a skilled person in the art within the scope of the claims. The present invention also encompasses, in its technical scope, any embodiment derived by combining technical means disclosed in differing embodiments.

Thus, an embodiment of the present invention is as follows.

<1> A method for manufacturing an injection-molded product by using a mold apparatus for a resin composition containing a poly(3-hydroxyalkanoate)-based resin, the poly(3-hydroxyalkanoate)-based resin being a copolymer containing at least one kind of copolymer of a 3-hydroxybutyrate unit and another hydroxyalkanoate unit, a mold included in the mold apparatus being configured so that: a parting line that is in contact with a cavity inside the mold when the mold is closed has a maximum width of not more than 30 µm; and a vent portion is provided at a position different from a position of the parting line that is in contact with the cavity inside the mold, the vent portion having an opening portion with a maximum width of 1 µm to 50 µm.

<2> The method according to <1>, wherein the mold comprises two or more cavities that are identical in shape.

<3> The method according to <2>, wherein, in the mold apparatus, distances from a tip of a nozzle of an injection molding machine to each of the cavities are even.

<4> The method according to any one of <1> to <3>, wherein the mold comprises a sprue and a runner, and the resin composition inside the sprue and the runner is in a molten state.

<5> The method according to any one of <1> to <4>, wherein the mold comprises a gate configured to be openable and closable.

<6> The method according to <4> or <5>, wherein, in the mold, a value obtained by dividing a total volume of the sprue, the runner, and the gate by a total volume of the cavity or cavities is 0.5 to 5.0.

<7> The method according to any one of <1> to <6>, wherein the mold comprises a mechanism for drawing out gas through the vent portion.

<8> The method according to any one of <1> to <7>, wherein the opening portion of the vent portion has a structure of at least one type selected from the group consisting of a slit type, a porous type, a nested type, and an opening-and-closing type.

<9> The method according to any one of <1> to <8>, wherein the 3-hydroxybutyrate unit in the poly(3-hydroxyalkanoate)-based resin is 80.0 mol % to 99.5 mol %.

<10> The method according to any one of <1> to <9>, wherein the resin composition further contains a second poly(3-hydroxyalkanoate)-based resin, the second poly(3-hydroxyalkanoate)-based resin contains at least one kind of copolymer of a 3-hydroxybutyrate unit and another hydroxyalkanoate unit, and the 3-hydroxybutyrate unit in the second poly(3-hydroxyalkanoate)-based resin is 65.0 mol % to 90.0 mol %.

<11> The method according to any one of <1> to <10>, wherein, injection molding in the method for manufacturing the injection-molded product is performed at a resin composition temperature that is not less than an end temperature of a melting point peak determined by differential scanning calorimetry in the resin composition.

<12> The method according to any one of <1> to <11>, wherein the resin composition further contains an inorganic bulking agent.

EXAMPLES

The following description will discuss embodiments of the present invention in further detail on the basis of Examples. However, the present invention is not limited to the Examples.

[Materials]

In Examples and Comparative Examples, the materials shown in Table 1 were used. PHA-H was prepared according to the method described in Example 9 of International Publication No. WO 2019/142845.

TABLE 1

| Category | Abbrev. | Product name | Contents | Manufacturer |
|---|---|---|---|---|
| P3HA | PHA-L | — | PHBH obtained by holding PHBH1101 (3HB unit = 98.2 mol %, Mw = 680,000) at 120° C. for 4.5 hours on a pressure cooker tester, and by adjusting the molecular weight to 350,000. | Kaneka Corporation |

TABLE 1-continued

| Category | Abbrev. | Product name | Contents | Manufacturer |
|---|---|---|---|---|
| | PHA-M | PHBH4303 | PHBH, 3HB unit = 94.1 mol %, Mw = 350,000 | Kaneka Corporation |
| | PHA-H | — | PHBH, 3HB unit = 71.8 mol %, Mw = 660,000 | Kaneka Corporation |
| Nucleating agent | PETL | Neulizer P | Pentaerythritol | Nippon Synthetic Chemical Industry Co., Ltd. |
| Lubricant | BA | BNT-22H | Behenic acid amide | Nippon Fine Chemical Co., Ltd. |
| Inorganic bulking agent | TALC | Micro Ace K1 | Talc | Nippon Talc Co., Ltd. |

PHBH: Poly(3-hydroxybutyrate-co-3-hydroxyhexanoate)
3HP: 3-Hydroxybutyrate
3HH: 3-Hydroxyhexanoate
Mw: Weight average molecular weight in terms of polystyrene

[Measuring Method and Evaluating Method]
In Examples and Comparative Examples, determination and evaluation were performed through the following method.
(End Temperature of Melting Point Peak)
A pellet obtained by the method described later in the section "Pelletization" below was used and was sliced into a thin film with a sample weight of 4.5±0.2 mg. Then, the thin film was placed on the bottom of an aluminum pan, and was subjected to determination of the melting point peak, using a differential scanning calorimeter. Based on an endothermic curve obtained by increasing temperature from 30° C. to 180° C. at a rate of 10° C./min under nitrogen gas stream, a temperature at which heat absorption was no longer observed was regarded as the end temperature of the melting point end peak.
(Flash Thickness)
Spoons at 10th shot, 20th shot, 30th shot, 40th shot, and 50th shot in injection molding were collected. Then, the spoons were observed at 400× magnification by using a microscope, and for a spoon with the largest flash, the maximum flash thickness was measured by software included with the microscope. If the maximum flash thickness was not more than 65 μm, it was determined that the flash thickness was small, whereas if the maximum flash thickness was not more than 60 μm, it was determined that the flash thickness was sufficiently small.

Examples 1 to 13 and Comparative Examples 1 and 2

Injection-molded products in accordance with Examples 1 to 13 and Comparative Examples 1 and 2 were manufactured according to the following method.

(Preparation of PHBH Blend)
In Examples 1 to 13 and Comparative Examples 1 and 2, a feeding amount Ce (kg) of each raw material was determined by using the following equation (1), on the basis of We, which is the amount, in terms of parts, of the raw material added in the PHBH blend, as shown in Tables 2 to 4, and Wt, which is the total amount, in terms of parts, of the PHBH blend added.

$$Ce = 10 \times We/Wt \quad (1)$$

The measured raw materials were fed into a 75 L super mixer manufactured by Kawata Mfk. Co., Ltd., and were mixed at 300 rpm for 3 minutes, to prepare a PHBH blend.
(Pelletization)
TEM26SS (L/D=60), manufactured by Toshiba Machine, was used, and the barrel temperature was set to 140° C. and the screw revolution number was set to 100 rpm. The feed rate F1 (kg/hr) of the PHBH blend at the screw root was determined by using the following equation (2), and the feed rate F2 (kg/hr) of an inorganic bulking agent at the side feed was determined by using the following equation (3), on the basis of Wt, which is the total amount, in terms of parts, of the PHBH blend added, and Wf, which is the amount, in terms of parts, of the inorganic bulking agent added.

$$F1 = 10 \times Wt/(Wt+Wf) \quad (2)$$

$$F2 = 10 \times Wf/(Wt+Wf) \quad (3)$$

A strand obtained from a dice was hardened by being made to pass through a water bath filled with warm water at 45° C., and then was cut with a pelletizer, to obtain a pellet.

TABLE 2

| Blend name | | Raw material abbrev. | Example 1 | Example 2 | Example 3 | Example 4 | Example 5 | Example 6 |
|---|---|---|---|---|---|---|---|---|
| Blended amount (parts by weight) | PHBH blend | PHA-L | 100 | 100 | 100 | 100 | 100 | 100 |
| | | PHA-M | — | — | — | — | — | — |
| | | PHA-H | — | — | — | — | — | — |
| | | PETL | 1 | 1 | 1 | 1 | 1 | 1 |
| | | BA | 0.5 | 0.5 | 0.5 | 0.5 | 0.5 | 0.5 |
| | | Total parts added | 101.5 | 101.5 | 101.5 | 101.5 | 101.5 | 101.5 |
| | Inorganic bulking agent | TALC | 20 | 20 | 20 | 20 | 20 | 20 |
| End temperature of melting point peak of resin composition (° C.) | | | 162 | 162 | 162 | 162 | 162 | 162 |
| Resin temperature (° C.) | | | 164 | 165 | 165 | 165 | 165 | 165 |

TABLE 3

| | Blend name | Raw material abbrev. | Example 7 | Example 8 | Example 9 | Example 10 | Example 11 | Example 12 | Example 13 |
|---|---|---|---|---|---|---|---|---|---|
| Blended amount (parts by weight) | PHBH blend | PHA-L | 100 | 100 | 100 | 100 | 70 | 100 | — |
| | | PHA-M | — | — | — | — | — | — | 100 |
| | | PHA-H | — | — | — | — | 30 | — | — |
| | | PETL | 1 | 1 | 1 | 1 | 1 | 1 | 1 |
| | | BA | 0.5 | 0.5 | 0.5 | 0.5 | 0.5 | 0.5 | 0.5 |
| | | Total parts added | 101.5 | 101.5 | 101.5 | 101.5 | 101.5 | 101.5 | 101.5 |
| | Inorganic bulking gent | TALC | 20 | 20 | 20 | 20 | 20 | — | 20 |
| End temperature of melting point peak of resin composition (° C.) | | | 162 | 162 | 162 | 162 | 162 | 162 | 151 |
| Resin temperature (° C.) | | | 165 | 165 | 164 | 165 | 164 | 164 | 154 |

TABLE 4

| | Blend name | Raw material abbrev. | Comparative Example 1 | Comparative Example 2 |
|---|---|---|---|---|
| Blended amount (parts by weight) | PHBH blend | PHA-L | 100 | 100 |
| | | PHA-M | — | — |
| | | PHA-H | — | — |
| | | PETL | 1 | 1 |
| | | BA | 0.5 | 0.5 |
| | | Total parts added | 101.5 | 101.5 |
| | Inorganic bulking agent | TALC | 20 | 20 |
| End temperature of melting point peak (° C.) | | | 162 | 162 |
| Resin temperature (° C.) | | | 164 | 165 |

(Preparation of Injection-Molded Product)

The injection molding machine Si-180V, manufactured by Toyo Machinery and Metal, was used to obtain a spoon with a total length of 160 mm by injected molding. The structure of each mold used in injection molding in Embodiments and in Comparative Examples is shown in Tables 6 to 8. The value obtained by dividing the total volume of the sprue, the runner, and the gate or gates by the total volume of the cavity or cavities was changed by changing the diameters of the sprue, the runner, and the gate or gates. Further, in the injection molding machine of Examples 1 to 3 and 6 to 13, and Comparative Examples 1 and 2, the gates (valve pin) were configured to be openable and closable. The hot gate temperature and the manifold temperature of the hot runner were set to 170° C. in Examples 1 to 3 and 6 to 12, and in Comparative Examples 1 and 2, and were set to 160° C. in Example 13. In Examples 4 and 5, in each of which a cold runner was used, a three-plate mold was used. The three-plate mold was identical in structure to that illustrated in FIG. 2, in which no heating mechanism is provided in the runner, the gate or gates, and the manifold. Molding conditions are shown in Table 5. Regarding the vent portion, a slit-type vent portion was provided as illustrated in FIG. 4, and a nested-type vent portion was provided as illustrated in FIG. 5.

TABLE 5

| | | | Examples 1-12, Comparative Examples 1, 2 | Example 13 |
|---|---|---|---|---|
| Molding conditions | Nozzle and barrel set temp. (° C.) | Nozzle temp. | 170 | 160 |
| | | Barrel 1 | 160 | 180 |
| | | Barrel 2 | 150 | 140 |
| | | Barrel 3 | 140 | 130 |
| | | Barrel 4 | 130 | 120 |
| | | Barrel 5 | 120 | 110 |
| | Mold surface temp. (° C.) | | 37 | 37 |

[Results]

Results of the measurement of the flash thicknesses of the injection-molded products obtained in Examples 1 to 13 and Comparative Examples 1 and 2 are shown in Tables 6 to 8. It should be noted that "-" in the tables means "0" or "none".

TABLE 6

| | | Example 1 | Example 2 | Example 3 | Example 4 | Example 5 | Example 6 |
|---|---|---|---|---|---|---|---|
| Structure of mold | Number of cavities | 16 | 16 | 16 | 16 | 1 | 16 |
| | Runner | Hot | Hot | Hot | Cold | Cold | Cold |
| | Distances between nozzle and each cavity | Even | Even | Even | Even | Even | Uneven |
| | Max. width of parting line (μm) | 5 | 10 | 5 | 5 | 5 | 5 |
| | Max. width of opening portion of vent portion (μm) | 10 | 10 | 20 | 10 | 10 | 10 |
| | Vent portion Mechanism | Nested type | Nested type | Nested type | Nested type | Nested type | Nested type |

TABLE 6-continued

|  |  | Example 1 | Example 2 | Example 3 | Example 4 | Example 5 | Example 6 |
|---|---|---|---|---|---|---|---|
|  | Position | Spoon head | Spoon head | Spoon head | Spoon head | Spoon head | Spoon head |
|  | (Total volume of sprue, runners, gates)/(total volume of cavities) | 1.5 | 1.5 | 1.5 | 1.5 | 1.5 | 1.5 |
| Resulting flash | Max. flash thickness (μm) | 31 | 44 | 53 | 46 | 33 | 48 |

TABLE 7

|  |  |  | Example 7 | Example 8 | Example 9 | Example 10 | Example 11 | Example 12 | Example 13 |
|---|---|---|---|---|---|---|---|---|---|
| Structure of mold | Number of cavities |  | 16 | 16 | 16 | 16 | 16 | 16 | 16 |
|  | Runner |  | Hot | Hot | Hot | Hot | Hot | Hot | Hot |
|  | Distances between nozzle and each cavity |  | Even | Even | Even | Even | Even | Even | Even |
|  | Max. width of parting line (μm) |  | 5 | 5 | 5 | 5 | 5 | 5 | 5 |
|  | Max. width of opening portion of vent portion (μm) |  | 10 | 10 | 10 | 10 | 10 | 10 | 10 |
|  | Vent portion 1 | Mechanism | Slit type (5 μm) | Nested type | Nested type | Nested type | Nested type | Nested type | Nested type |
|  |  | Position | Eject pin (4 min in diameter) | Spoon head | Spoon head | Spoon head | Spoon head | Spoon head | Spoon head |
|  |  | Suction of Gas | — | Vacuum pump | — | — | — | 1.5 | — |
|  | Vent portion 2 | Mechanism | — | — | Slit type (5 μm) | Slit type (5 μm) | — | 62 | — |
|  |  | Position | — | — | Eject pin | Eject pin | — | — | — |
|  |  | Suction of Gas | — | — | — | Vacuum pump | — | — | — |
|  | (Total volume of sprue, runners, gates)/(total volume of cavities) |  | 3.5 | 1.5 | 1.5 | 1.5 | 1.5 | 1.5 | 1.5 |
| Resulting flash | Max. flash thickness (μm) |  | 47 | 21 | 26 | 22 | 39 | 45 | 62 |

TABLE 8

|  |  | Comparative Example 1 | Comparative Example 2 |
|---|---|---|---|
| Structure of mold | Number of cavities | 16 | 16 |
|  | Runner | Hot | Hot |
|  | Distances between nozzle and each cavity | Even | Even |
|  | Max. width of parting line (μm) | 40 | 5 |
|  | Max. width of opening portion of vent portion (μm) | 10 | 60 |
|  | Vent portion Mechanism | Nested type | Nested type |
|  | Position | Spoon head | Spoon head |
|  | (Total volume of sprue, runners, gates)/(total volume of cavities) | 1.5 | 1.6 |
| Resulting flash | Max. flash thickness (μm) | 89 | 82 |

Tables 6 and 7 show that the maximum flash thicknesses are small or sufficiently small in Examples 1 to 13. In addition, in Examples 8 to 10, in which a mechanism for drawing out gas is provided, the maximum flash thicknesses are further smaller, compared with other Examples in which no mechanism for drawing out gas is provided.

On the other hand, in Comparative Example 1, the maximum width of the parting line in contact with the cavity inside the mold was 40 μm, and in this case, the maximum flash thickness was greater than 60 μm. In Comparative Example 2, a gap formed at a position different from that of the parting line was 60 μm, and in this case, the maximum flash thickness was greater than 60 μm.

Therefore, it has been found that the use of a specific mold (i.e., a mold in which the parting line that is in contact with a cavity inside the mold has a maximum width of not more than 30 μm when the mold is closed, and a vent portion is provided at a position different from that of the parting line that is in contact with the cavity inside the mold) enables stable continuous production without generating flash.

INDUSTRIAL APPLICABILITY

According to the present invention, it is possible to perform stable continuous production without generating flash. Thus, the present invention can be preferably utilized in the field of manufacturing injection-molded products by using a P3HA-based resin (in particular, a P3HA-based resin with a high ratio of 3HB), and in other fields.

REFERENCE SIGNS LIST

1 Mold (protruding part)
2 Mold (concave part)
3 Mold
10 Mold apparatus
11 Sprue 12 Runner
13 Gate
14 Nozzle
21 parting line in contact with cavity inside mold
31 Cavity
41 Vent portion
42 Slit
43 Nested portion
44 opening portion of vent portion (nested type)
51 Eject pin
61 Injection molding machine

The invention claimed is:

1. A method for manufacturing an injection-molded product, comprising:
performing an injection molding of a resin composition with a mold apparatus,
wherein the resin composition includes a poly(3-hydroxyalkanoate)-based resin including at least one copolymer of a 3-hydroxybutyrate unit and another hydroxyalkanoate unit, and
the mold apparatus includes a mold having a cavity and a vent portion and being configured such that when the mold is closed, a parting line that is in contact with the cavity has a maximum width of not more than 30 μm, and that the vent portion is formed at a position different from a position of the parting line and has an opening portion with a maximum width of 1 μm to 50 μm.

2. The method according to claim 1, wherein the mold comprises two or more cavities that are identical in shape.

3. The method according to claim 2, wherein the mold apparatus includes an injection molding machine having a nozzle and being configured such that distances from a tip of the nozzle to each of the cavities are even.

4. The method according to claim 1, wherein the mold comprises a sprue and a runner, and the resin composition inside the sprue and the runner is in a molten state.

5. The method according to claim 4, wherein the mold comprises a gate configured to be openable and closable.

6. The method according to claim 5, wherein the mold is configured such that a value obtained by dividing a total volume of the sprue, the runner, and the gate by a total volume of the cavity or cavities is 0.5 to 5.0.

7. The method according to claim 1, wherein the mold comprises a mechanism for drawing out gas through the vent portion.

8. The method according to claim 1, wherein the opening portion of the vent portion has a structure of at least one type selected from the group consisting of a slit type, a porous type, a nested type, and an opening-and-closing type.

9. The method according to claim 1, wherein the poly(3-hydroxyalkanoate)-based resin includes the 3-hydroxybutyrate unit at 80.0 mol % to 99.5 mol %.

10. The method according to claim 1, wherein
the resin composition further includes a second poly(3-hydroxyalkanoate)-based resin,
the second poly(3-hydroxyalkanoate)-based resin includes at least one copolymer of a 3-hydroxybutyrate unit and another hydroxyalkanoate unit, and
the second poly(3-hydroxyalkanoate)-based resin includes the 3-hydroxybutyrate unit at 65.0 mol % to 90.0 mol %.

11. The method according to claim 1, wherein the injection molding is performed at a resin composition temperature that is not less than an end temperature of a melting point peak determined by differential scanning calorimetry in the resin composition.

12. The method according to claim 1, wherein the resin composition further includes an inorganic bulking agent.

13. A mold apparatus, comprising:
a mold having a cavity and a vent portion, the mold being configured such that when the mold is closed, a parting line that is in contact with the cavity has a maximum width of not more than 30 μm, and that the vent portion is formed at a position different from a position of the parting line and has an opening portion with a maximum width of 1 μm to 50 μm.

14. The mold apparatus according to claim 13, wherein the mold comprises two or more cavities that are identical in shape.

15. The mold apparatus according to claim 14, further comprising:
an injection molding machine having a nozzle and being configured such that distances from a tip of the nozzle to each of the cavities are even.

16. The mold apparatus according to claim 13, wherein the mold comprises a sprue and a runner.

17. The method according to claim 16, wherein the mold comprises a gate configured to be openable and closable.

18. The mold apparatus according to claim 17, wherein the mold is configured such that a value obtained by dividing a total volume of the sprue, the runner, and the gate by a total volume of the cavity or cavities is 0.5 to 5.0.

19. The mold apparatus according to claim 13, wherein the mold comprises a mechanism for drawing out gas through the vent portion.

20. The mold apparatus according to claim 13, wherein the opening portion of the vent portion has a structure of at least one type selected from the group consisting of a slit type, a porous type, a nested type, and an opening-and-closing type.

* * * * *